United States Patent [19]
Gunther et al.

[11] 4,344,668
[45] Aug. 17, 1982

[54] FIBER OPTIC LIGHT TRAPS FOR ELECTRO-OPTICAL DISPLAY DEVICES

[75] Inventors: John E. Gunther, Torrance; William R. Lichty, Culver City; William C. Hoffman, Torrance, all of Calif.

[73] Assignee: Hughes Aircraft Company, Culver City, Calif.

[21] Appl. No.: 130,638

[22] Filed: Mar. 17, 1980

[51] Int. Cl.³ .................................................. G02B 5/16
[52] U.S. Cl. ........................... 350/96.27; 350/276 SL; 350/334; 350/345
[58] Field of Search ............ 350/96.27, 339 R, 339 D, 350/340, 341, 345, 276 SL, 284, 334

[56] References Cited

U.S. PATENT DOCUMENTS

| | | | |
|---|---|---|---|
| 3,253,500 | 5/1966 | Hicks | 350/96.29 |
| 3,360,672 | 12/1967 | Marshall | 350/96.27 X |
| 3,824,002 | 7/1974 | Beard | 350/342 |
| 3,824,003 | 7/1974 | Koda et al. | 350/333 |
| 3,862,360 | 1/1975 | Dill et al. | 350/332 X |
| 3,891,309 | 6/1975 | Bonne | 350/338 |
| 3,907,403 | 9/1975 | Maeda | 350/96.27 |
| 3,976,361 | 8/1976 | Fraas et al. | 350/342 |
| 4,005,929 | 2/1977 | Adams et al. | 350/345 |
| 4,006,968 | 2/1977 | Ernstoff et al. | 350/339 F |
| 4,017,157 | 4/1977 | van Riet | 350/334 X |
| 4,090,219 | 5/1978 | Ernstoff et al. | 358/59 |
| 4,195,915 | 4/1980 | Lichty et al. | 350/345 |
| 4,299,447 | 11/1981 | Soltan et al. | 350/334 |

FOREIGN PATENT DOCUMENTS

| | | |
|---|---|---|
| 2136761 | 2/1973 | Fed. Rep. of Germany . |
| 2461239 | 6/1976 | Fed. Rep. of Germany . |
| 2020106 | 7/1970 | France . |
| 1067149 | 5/1967 | United Kingdom . |

*Primary Examiner*—John D. Lee
*Attorney, Agent, or Firm*—Gerald B. Rosenberg; Joseph E. Szabo; William H. MacAllister

[57] ABSTRACT

In an electro-optical display device, a fiber optic faceplate which transmits light only through a well-defined solid angle, is optically coupled to an electro-optical display panel having a specularly reflecting surface. The display panel can be either an active device, such as laser diodes, or passive such as a dynamic scattering liquid crystal device. The axes of the optical fibers comprising the faceplate are slanted to the display surface at an angle such that the light which enters the front surface of the faceplate and is specularly reflected from the display surface is trapped within the faceplate. However, light emitted or scattered from on-state display elements is transmitted through the faceplate to the viewer.

A high contrast display results because off-state display elements on the display surface appear dark under even intense ambient illumination whereas the on-state elements appear bright.

The faceplate has two major opposing surfaces which are aligned to one another at a predetermined angle in order to control the size and direction of the display field of view.

21 Claims, 5 Drawing Figures

FIBER OPTIC LIGHT TRAPS FOR ELECTRO-OPTICAL DISPLAY DEVICES

TECHNICAL FIELD

This invention relates generally to electro-optical display devices wherein information is displayed on a surface and particularly to such devices which achieve high contrast by using a fiber optic faceplate as a light trap.

BACKGROUND OF THE INVENTION

Electro-optical display panels wherein information such as images or alphanumeric characters is displayed on a surface includes both active and passive devices. Active devices such as light emitting diodes, gas discharge elements, and thin film electro-luminescent elements generate their own light. Passive devices such as liquid crystal displays generate no light of their own but rather modulate incident light from natural or artificial external sources.

One particular type of liquid crystal display with which this invention is concerned is a liquid crystal in which the basic components include a liquid crystal layer sandwiched between a transparent front electrode and a reflective back electrode. In the off-state, that is with no voltage applied across the electrodes, the liquid crystal is transparent. Conversely, in the on-state, that is with a voltage applied across the electrodes, current flowing through the liquid crystal creates a turbulence that causes scattering of the light passing through the layer so that the liquid crystal appears like frosted glass. By proper illumination techniques, the viewer can distinguish between the scattering and nonscattering regions. Because the scattering increases with applied voltage, shades of grey may be obtained by varying the voltage applied to various elements. This mode of modulation of the transmissivity of liquid crystal material in response to an applied voltage is called the "dynamic scattering mode."

In practical applications, a spatially modulated electric field pattern containing image information to be displayed is impressed upon the liquid crystal by one of several methods. In one method, a matrix of individually addressable minute electrodes, each electrode forming one picture element, is formed on the backplate of the liquid crystal light valve. Such an approach is described in U.S. Pat. No. 3,824,003 issued to N. J. Koda et al. on July 16, 1974; U.S. Pat. No. 3,862,360 issued to H. D. Dill et al. on Jan. 21, 1975, and U.S. Pat. No. 4,006,968 issued to M. N. Ernstoff et al. on Feb. 8, 1977.

In another method, the image containing electric field pattern is generated from an input image directed onto a photo-conductive layer located on the backside of the liquid crystal light device. Such devices are disclosed in U.S. Pat. No. 3,824,002 issued to T. D. Beard on July 16, 1974 and U.S. Pat. No. 4,976,361 issued to L. M. Fraas et al. on Aug. 24, 1976.

Any one of these aforementioned patents may be used with the present invention and for the sake of completeness are incorporated by reference herein.

An inherent problem encountered in both the active and passive displays of the types described is that the contrast of the display is objectionably reduced by reflections from the specular display surfaces. Heretofore this problem has been solved by a light trap configuration in which the display is tilted to the viewer's line of sight so that all specular reflections from the display surface must originate from a preselected external area. That area is then blocked with a dark shield called a light trap. An example of such a configuration is disclosed in the image display device of U.S. Pat. No. 4,090,219 issued to M. N. Ernstoff et al. on May 16, 1978. In an arrangement described in FIG. 1 of that patent, a light trap comprising a planar member having a light absorbing surface extends outward from an electro-optical display panel, in this case a liquid crystal display device. The display surface is tilted to the viewers line of sight so that when the liquid crystal is in the transparent off-state, the viewer sees the dark light trap surface reflected from the backplate of the liquid crystal device with the result that the light valve appears black. When the cell is in the scattering on-state, the illumination is scattered from it toward the observer so that the activated portion of the surface appears white.

Although this display arrangement maintains a high contrast image even under illumination from highly intense sources, the arrangement has several disadvantages, one of them being that the tilt of the display surface causes objectionable foreshortening of the image displayed on the liquid crystal layer. Another disadvantage is the difficulty in designing a light trap geometry which permits locating an artificial light source needed to illuminate the display without blocking the field of view.

SUMMARY OF THE INVENTION

Accordingly, it is an object of the present invention to provide means for improving the performance of image display arrangements using either active or passive electro-optical display devices. P Another object of the present invention is to provide a display device which blocks all specular reflections from the display surface so as to maintain a high-contrast image.

A further object of the invention is to provide a direct view electro-optical display device which is compact.

A still further object is to provide such a display device which can be viewed perpendicularly to the display surface, thereby decreasing geometric distortion present in the prior art devices of this type.

Yet another object is to provide a liquid crystal display device in which an external light source can be conveniently located near the plane of the display so as to leave the field of view unobstructed.

These and other objects and advantages are achieved in an image display device in which an electro-optical display panel having a specularly reflecting surface is optically coupled to a fiber optic faceplate. The faceplate has a back surface adjacent the display surface and a front surface which is aligned at a predetermined angle $\beta$ to the back surface. The faceplate comprises a multiplicity of parallel optical fibers, each of which have an acceptance solid angle which defines exclusively the angular range through which light is transmitted through the fibers. The fiber axes are tilted at an angle to the back surface such that light which enters the front surface of the faceplate and is specularly reflected from the display surface is trapped within the faceplate. However, light emitted or scattered from on-state display elements is transmitted through the faceplate to the viewer. A high contrast display results because reflecting off-state elements on the display surface appear dark under even high ambient light levels whereas the scattering or emitting on-state elements appear bright. The size and the direction of the display field of view is controlled by selecting the proper value of angle $\beta$.

BRIEF DESCRIPTION OF THE DRAWINGS

These and other objects, features and advantages will be more fully apparent in the following detailed description taken in conjunction with the accompanying drawings, wherein like numbers refer to like parts throughout and in which:

FIG. 5 is a schematic view of a light emitting display device having a wedge-shaped faceplate in accordance with yet another embodiment of the invention.

DETAILED DESCRIPTION OF THE DRAWINGS

Figure 1:
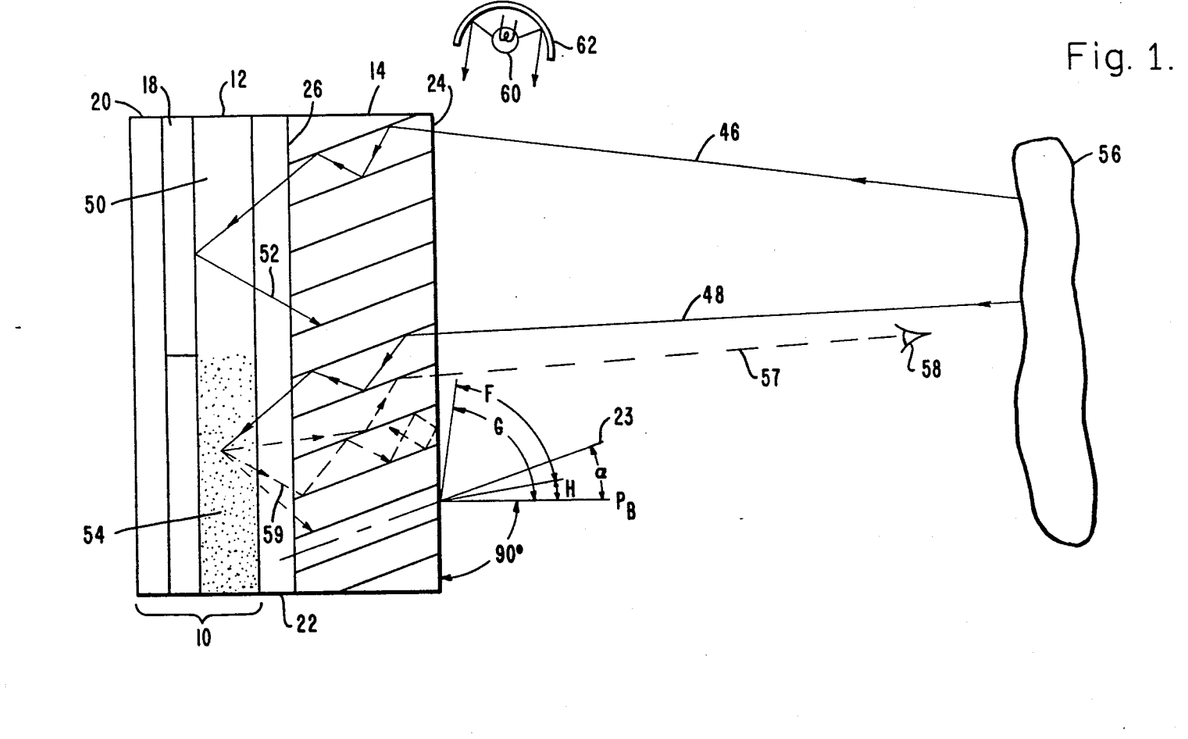
FIG. 1 is a schematic view of a liquid crystal display device in accordance with one embodiment of the invention.

Referring now in greater detail to FIG. 1, there is shown a schematic of a liquid crystal image display device. The electro-optical display panel 10 is a liquid crystal device operating in the dynamic scattering mode. It is formed by sandwiching a layer of liquid crystal material 12 between a reflective electrode 18 mounted upon backplate 20 and a fiber optic faceplate 14 having a front major surface 24 and a back major surface 26. Surfaces 24 and 26 are parallel to liquid crystal layer 12. The inner surface of faceplate 14 has a transparent electrode 22. As pointed out earlier, liquid crystal layer 12 is transparent when no electric field is present but scatters light when an electric field is applied. If the electric field is driven by electronic signals, then the backplate 20 contains a matrix array of reflective electrodes as described earlier. However, if the device is to be driven by an input image then backplate 20 includes a photoconductor of the type shown in the Beard or Fraas patents described above. With either of these drive arrangements, the image desired for display is transformed into an electric field pattern across the liquid crystal layer.

Figure 2:
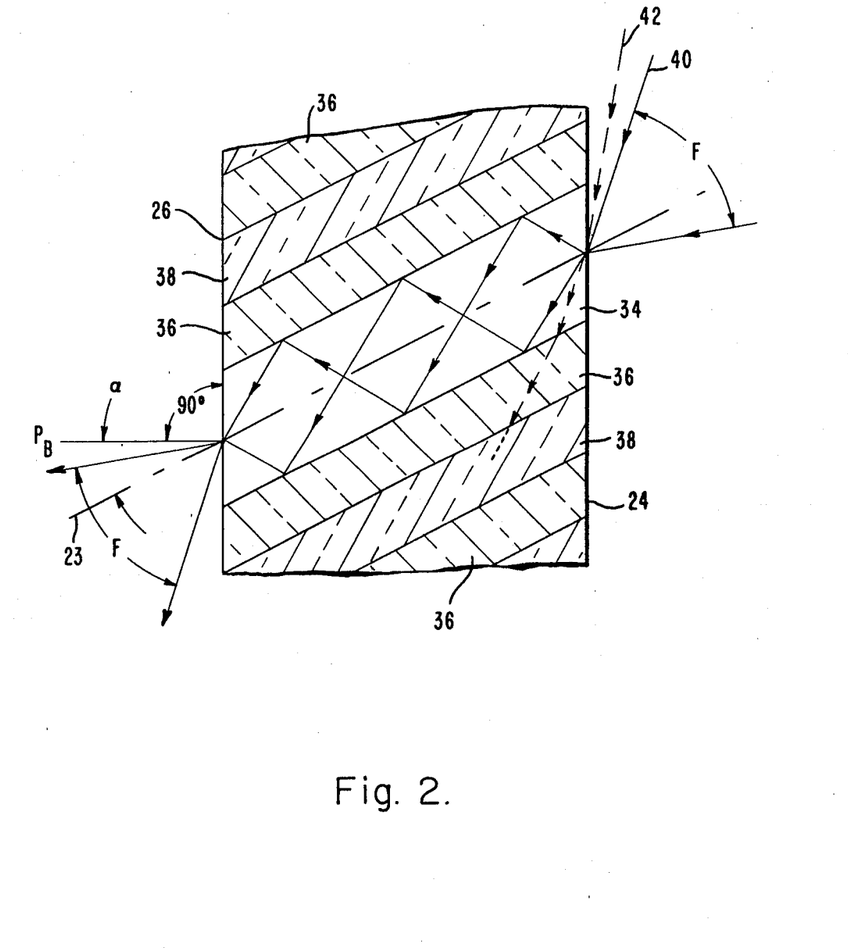
FIG. 2 is a detail of a particular type of fiber optic faceplate used in the embodiment shown in FIG. 1 and FIG. 3.

Before continuing with FIG. 1, we refer now to FIG. 2 illustrating in greater detail one type of fiber optic faceplate 14 suitable for use with the system of FIG. 1. The faceplate is formed by a multiplicity of optical fibers whose longitudinal axes, such as axis 23, are parallel to each other and slanted at an angle $\alpha$ to the perpendicular $P_B$ to back surface 26. The definition of angle $\alpha$ will be amplified later. Each fiber comprises a transparent core 34 covered with a transparent sheath 36 having an index of refraction less than the index of refraction of core 34 and the sheath is, in turn, covered by an optically absorbing material 38 which can form either a layer on sheath 36 or an interstitial filler between adjacent fibers formed by core 34 and sheath 36. Light, such as ray 40, incident within a solid angle which subtends an angle F to be defined, propagates through the core 34 by means of multiple total internal reflections from the boundary of the core 34 and transparent sheath 36.

On the other hand, light outside the acceptance angle does not transmit through the fiber. For example, a highly oblique ray, such as ray 42 incident on the faceplate outside of angle F will not be totally reflected but will instead propagate through the sheath 36 and be absorbed in the light absorbing layer 38. The faceplate thus has a light acceptance solid angle which defines exclusively the angular range through which light is transmitted through the faceplate.

Suitable all-glass fiber optic faceplate material having a wide range of indices of refraction is available as a standard product known as fused fiber faceplate containing ExtraMural Absorption (EMA), where EMA refers to the light absorbing material 38. Vendors of the product include Gallileo Electro-Optics Corp., Sturbridge, Mass.; American Optical Company Corp., Sturbridge, Mass. and Collimated Holes, Inc., Cambell, Calif. As manufactured, the faceplate can have a more complex structure than described with reference to FIG. 2, but all have an array of fibers comprising a light transmitting core 34 and a light absorbing material which in combination provide a well defined solid angle having a specified elevation angle F. From a block of the EMA material, the faceplate 14 is cut and polished by conventional optical fabrication techniques into a plate having parallel faces at an angle $\alpha$ to the optical fiber axes.

Referring again to FIG. 1, light rays, such as rays 46 and 48 leaving source 56 impinge upon faceplate 14 within the acceptance angle F and are thereby transmitted to liquid crystal layer 12. Source 56 can be, for example, bright sky, illuminated room walls or other natural or artifical light sources. In particular, ray 46 incident upon a liquid crystal area 50 in the off-state is specularly reflected from electrodes 18 along ray path 52 back into the faceplate 14 where it is absorbed. A key feature of all embodiments of the invention is that the fiber slant angle $\alpha$ to back surface 26 is selected such that all light which enters the front surface 24 of faceplate 14 and is specularly reflected from electrode 18 is directed outside of the acceptance solid angle F and is therefore trapped by absorption within faceplate 14. The result is that the off-state region 50 appears dark.

Now considering light ray 48 incident upon a liquid crystal area where a voltage is applied across the liquid crystal layer, such as in area 54, some of the scattered light is directed within the acceptance solid angle, such as along ray path 57 to the viewer 58 who therefore sees a relatively bright display region. Thus, a viewer observes an image on the liquid crystal layer formed by dark, reflecting areas in the off-state and bright, scattering areas in the on-state.

Angle $\alpha$ can be described by the relationship $$\alpha \geq \cos^{-1} n'_2/n_1 \quad (1)$$

where:

$n_1$ is the index of refraction of core 34, $n'_2$ is the effective index of refraction of sheath 36.

The nominal sheath index of refraction $n_2$ is increased to $n'_2$ by the proximity of the EMA material 38. Values of $n_1$, $n_2$ and $n'_2$ for various faceplate materials are available from the vendors previously given. The inequality sign in equation (1) represents the fact that in practice, $\alpha$ is increased by a few degrees to compensate for manufacturing tolerances in the faceplate 14 and electro-optical display device 10.

Angle F is related to the indices of refraction of the core and the sheath, $n_1$ and $n_2$, respectively, and the slant angle $\alpha$ by the relationship:

$$F = G - H \qquad (2)$$

where

G = maximum elevation angle to faceplate normal $P_B$ $$= \sin^{-1}\left[n_1\left(\sin\alpha + \cos^{-1}\frac{n'_2}{n_1}\right)\right] \qquad (3)$$

and H = minimum elevation angle to faceplate normal $P_B$ $$= \sin^{-1}\left[n_1 \sin\left(\alpha \cos^{-1}\frac{n'_2}{n_1}\right)\right] \qquad (4)$$

Note, that if the expression within brackets above is greater than 1, $G = 90°$ and some light is trapped within the faceplate by total internal reflection.

Because viewing is near the perpendicular to the display, the geometric foreshortening present in the prior art display using a planar light trap described earlier is minimized. Moreover, the compactness of the device makes it suitable for use in cramped areas such as aircraft cockpits and automobile dashboards.

A specific illustrative example will now be given for constructing an arrangement according to FIG. 1. Using a fiber optic faceplate having typical values of $n_1 = 1.70$, $n_2 = 1.50$ and $n'_2 = 1.53$, it can be determined from equation 1 that the angle $\alpha$ to provide for the total absorption of specularly reflected incident radiation is $\alpha \geq 25.8°$. Adding 2.2° for tolerancing gives $\alpha = 28°$. Using equations 3 and 4, it can be respectively calculated that, for $\alpha = 28°$, the angle G equals 90° and angle H equals 3.7°. From equation 2, $F = 90 - 3.7 = 86.3°$. For these values of F and H the field of view F extends from the plane of the faceplate to approximately 4° short of the faceplate perpendicular $P_B$.

A slight limitation of the faceplate embodiment of FIG. 1 which is eliminated in the embodiments of FIGS. 4 and 5, to be later discussed, is that for obtainable indices of refraction $n_1$ and $n'_2$, the field of view is skewed with respect to the faceplate normal $P_B$. Furthermore, the field of view falls just short of encompassing the faceplate perpendicular $P_B$. Thus, a viewer would generally observe the display from at least a slightly oblique angle.

The cause of this field of view limitation is illustrated in FIG. 1. Rays such as ray 59 leaving the display surface at angles near the faceplate perpendicular $P_B$ are trapped within the faceplate by total internal reflection at front surface 24.

To provide night lighting and added daytime lighting, an external light source 60 is located in front and near the plane of faceplate 14 but within the acceptance angle F as shown in FIG. 1. Thus positioned, the source does not interfere with the viewer's line of sight. Light from source 60 is collected by a mirror 62 and directed onto the front surface 24 of faceplate 14 so that the light will exit the back surface 26 of the faceplate in order to illuminate the liquid crystal layer 12. Light source 60 can be an arc lamp, incandescent light or a fluorescent tube.

Figure 3:
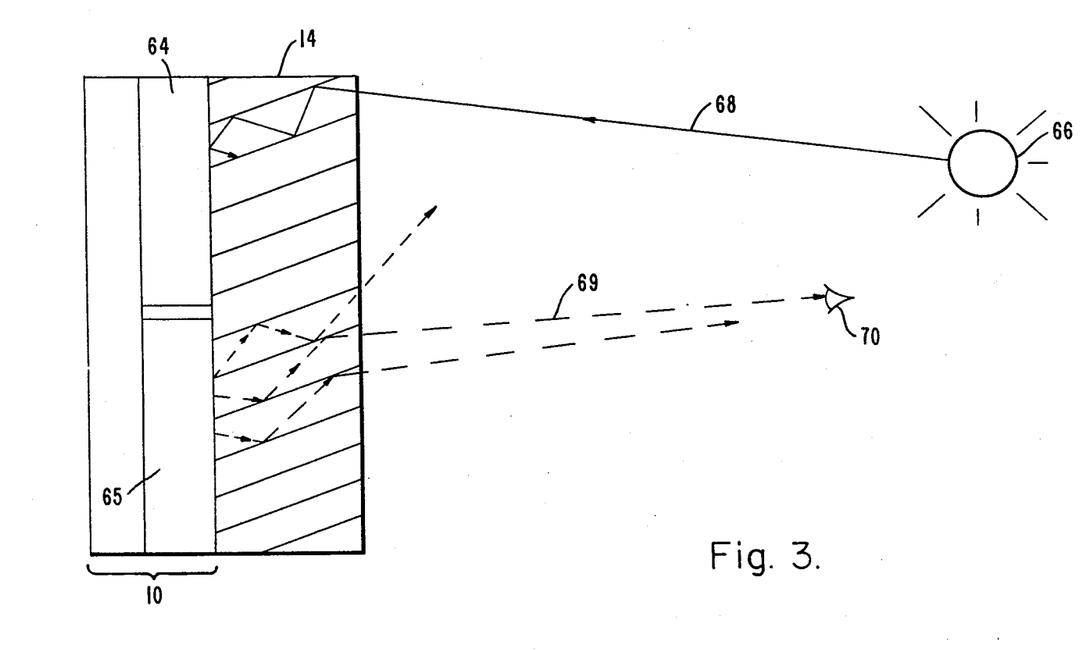
FIG. 3 is a schematic view of an electro-optical display device in which information is displayed by means of light emitting elements.

A further embodiment of the invention is illustrated in FIG. 3. The embodiment of FIG. 3 differs from that of FIG. 1 in that the electro-optical display panel 10 comprises light emitting elements such as elements 64 and 65 which, in addition to emitting light, also undesirably reflect ambient illumination. These elements can be gas discharge, light emitting diodes or thin film electroluminescent devices, to name some specific examples. As in FIG. 1, the faceplate 14 provides the display with a high contrast over a wide viewing angle even when viewed in high intensity ambient illumination. For example, unwanted light source 66 emits a light ray 68 which is specularly reflected from element 64 in the off-state. All specularly reflected light is absorbed by the face plate so that the display appears dark. Conversely, emitting element 65 emits diffusely in all directions. Much of the emitted light is within the acceptance angles of the faceplate and some, such as ray 69, is thereby transmitted to the viewer 70. Thus, the off elements of the display appear dark and the on elements appear bright, even under intense external illumination conditions.

Figure 4:
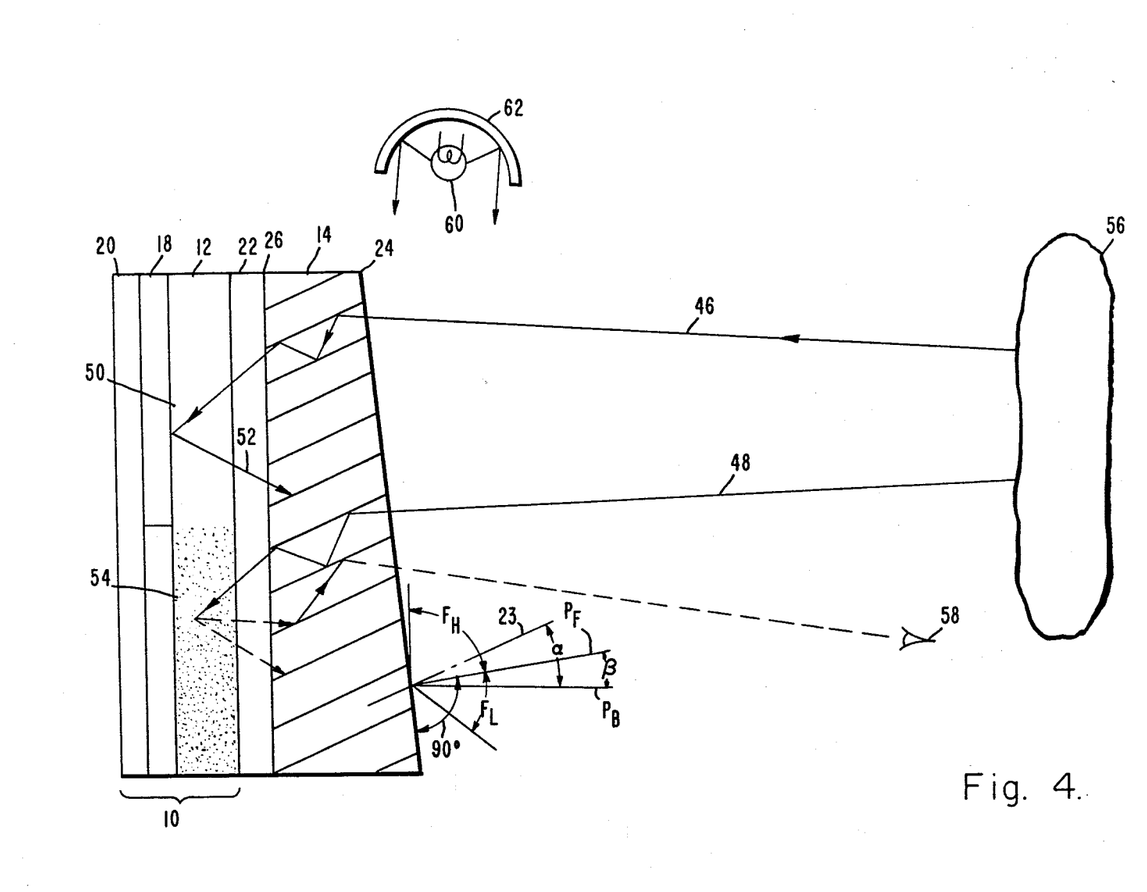
FIG. 4 is a schematic view of a liquid crystal image display device having a wedge-shaped faceplate in accordance with another embodiment of the invention.

A third embodiment of the present invention is illustrated in FIG. 4. The embodiment of FIG. 4 is the same as that of FIG. 1 except that the fiber optic face plate 14 is modified into a wedge shape in which the back surface 26 remains parallel to the liquid crystal display layer 12 and the front surface 24 is tilted in elevation at an angle $\beta$ to the back surface of the face plate.

The advantage of a faceplate of the wedge shape shown in FIG. 4 is that the field of view is tilted towards the normal relative to the faceplate configuration of FIG. 1. Therefore, the display can be viewed perpendicularly to the front surface 24 of the faceplate. In the faceplate configuration of FIG. 1, as was described earlier, the field of view is somewhat limited because some light is undesirably trapped within the faceplate by total internal reflection at the interface between the front surface 24 and air. This limitation is minimized, if not eliminated, by wedging the faceplate as shown in FIG. 4. With the wedge angle properly selected, all light can be made to exit the faceplate. The beneficial results are that the display has a maximum possible field of view and, by proper design, the field of view can be tilted so as to be centered about the perpendicular to the front surface 24.

The wedge angle $\beta$ required to maximize field of view, while maintaining the upper edge of the field of view near the surface 24 to allow external illumination as previously shown in FIG. 1, is given by the relationship $$\beta \geq \alpha + \cos^{-1}(n'_2/n_1) - \sin^{-1}(1/n_1) \qquad (5)$$

The sense of $\beta$ is such that the perpendicular $P_F$ to front surface 24 is intermediate the fiber axes 23 and the perpendicular $P_B$ to back surface 26. As is apparent from FIG. 4, angle $\beta$ lies within the plane of the drawing; that is, a plane passing through perpendicular $P_B$ and $P_F$. For a given $\beta$, the field of view in elevation can be defined by V, the sum of angles $F_H$ and $F_L$, lying respectively above and below the perpendicular $P_F$.

Thus, the field of view V is given by $$V = F_H + F_L \qquad (6)$$

$F_H$ and $F_L$ are defined by the equations $$F_H = \sin^{-1}\left[n_1 \sin\left(\alpha + \cos^{-1}\frac{n'_2}{n_1} - \beta\right)\right] \quad (7)$$

$$F_L = \sin^{-1}\left[n_1 \sin\left(-\alpha + \cos^{-1}\frac{n'_2}{n_1} + \beta\right)\right] \quad (8)$$

A specific illustrative example will now be given for constructing a light trap arrangement according to FIG. 4. Again using indices of refractions of $n_1 = 1.70$ and $n'_2 = 1.53$ and substituting into the equation (1) for $\alpha$, the value of $\alpha$ is $\geq 26°$. Allowing a tolerance of 2° to account for non-uniformities in the reflective display surface and the indices of refraction within the face plate, $\alpha$ is selected to be $26° + 2° = 28°$. Substituting this value of $\alpha$ into the equation (5) yields for $\beta$ $$\beta \leq 28 + 26 - \sin^{-1}(1/1.70) = 16°$$

Finally, subtracting a typical tolerancing of 2°, provides the selected value of $$\beta = 16° - 2° = 14°$$

The field of view is then determined from equations (7) and (8) to be $F_H = 90°$ and $F_L = 20.7°$, or a total field of view of $V = 110.7°$, extending 90° above the perpendicular to the faceplate front surface and 20.7° below the faceplate perpendicular. As compared with the device of FIG. 1, wedging the faceplate increases the field of view by approximately $110.7° - 87° = 23.7°$ and tilts the field of view down by $4° + 20.7° = 24.7°$ to encompass the perpendicular $P_F$ to the front surface 24. As with the embodiment of FIG. 1, a light source 60 and mirror 62 can be located as shown at the top of the display at the edge of the viewing cone in order to provide fill-in and night illumination.

Referring to FIG. 5, there is shown a light emitting display device as another embodiment of the invention. Light such as ray 72 from unwanted source 74 is transmitted by total internal reflection to the face plate 14, reflected off the specular surface of active element 64 and trapped within the face plate as shown. As was previously described for the embodiment of FIG. 3, some of the light emitted by element 65 in the on state is directed back along path 76 to the viewer 78. The beneficial effects common to all display embodiments shown is that a high contrast is provided over a wide viewing angle even under intense illumination, while using a compact light trap.

Unlike the liquid crystal device of FIG. 4, an external light source is not used. Thus, the field of view need not extend to the edge of the display. As a specific example of the device of FIG. 5, the value of $\beta$ is selected so as to have a field of view centered on the perpendicular $P_F$ of the front surface 24 of the faceplate. Such a field of view can be achieved by selecting wedge angle $\beta$ such that the axis of the fibers 23 is perpendicular to the front surface 24. This condition is mathematically defined by the expression $$\beta = \alpha$$

As previously, when $n_1 = 1.70$, $n'_2 = 1.53$, $\alpha = 28°$. Setting $\alpha = \beta = 28°$, equations (7) and (8) indicate that $F_L = F_H = 47.8°$. This yields a field of view $V = F_L + F_H = 95.6°$ centered about the normal $P_F$ to surface 24.

What is claimed is:
1. A display device comprising:
    (a) an electro-optical display panel having a specularly reflecting display surface; and
    (b) a fiber optic faceplate having a back major surface and a front major surface aligned at a predetermined angle $\beta$ to one another, wherein said back surface is parallel to and adjacent said display surface, wherein said faceplate has a multiplicity of optical fibers, each of said fibers having an acceptance solid angle which defines exclusively the angular range through which light is transmitted by said fibers, wherein said fibers have longitudinal axes which are parallel to a plane passing through a perpendicular to said back surface and a perpendicular to said front surface, and which are slanted at an acute angle $\alpha$ to said perpendicular to said back surface, and wherein said angle $\alpha$ is selected such that light which enters said front surface and is specularly reflected from said display surface back into said faceplate is directed outside of said acceptance solid angle.

2. The device of claim 1 wherein light incident upon said faceplate outside of said acceptance angle is absorbed within said faceplate.

3. The device of claim 2 wherein each of said fibers comprises a transparent core covered with a transparent sheath having an index of refraction less than the index of refraction of said core, and an optically absorbing material covering said sheath.

4. The device of claim 3 wherein said angle $\alpha$ is defined by the relationship $$\alpha \geq \cos^{-1}(n'_2/n_1)$$

where $n_1$ = index of refraction of said core
$n'_2$ = effective index of refraction of said sheath.

5. The device of claim 1 wherein said back and front major surfaces of said faceplate are parallel.

6. The device of claim 1 wherein said angle $\beta$ is selected so as to define the size and tilt of said acceptance solid angle by controlling the amount of display light which is trapped by total internal reflection at said front surface.

7. The device of claim 1 wherein $\beta$ is defined by the relationship $$\beta \leq \alpha + \cos^{-1}(n'_2/n_1) - \sin^{-1}(1/n_1)$$

wherein the sense of $\beta$ is such that the perpendicular to said front surface is intermediate said fiber axes and said perpendicular to said back surface.

8. The device of claim 1 wherein said electro-optical display panel is a reflective liquid crystal device including a liquid crystal light valve operating in the dynamic scattering mode.

9. The device of claim 8 wherein said liquid crystal device is electronically activated by an array of individually addressable electrodes formed within said light valve.

10. The device of claim 8 wherein said liquid crystal device is photoactivated by a photoconductor member formed within said device.

11. The device of claim 8 further comprising an artificial light source disposed in front of said faceplate so that light from said source is directed through said faceplate onto said liquid crystal display device.

12. The device of claim 1 wherein said electro-optical display panel is a light emitting device.

13. The device of claim 12 wherein said front surface of said faceplate is perpendicular to said fiber axes.

14. The device of claim 1 wherein said electro-optical display panel is a passive device.

15. An electro-optical display system comprising:
(a) an electro-optical display panel having a specularly reflecting display surface and means for providing substantially randomly directed light; and
(b) a faceplate having front and back major surfaces, said back major surface being adjacent to said electro-optical display panel, said faceplate including a plurality of optical fibers aligned such that the cylindrical axes of said fibers are parallel to one another and slanted at an acute angle from the perpendicular to said back major surface, wherein the slant of said optical fibers is sufficient for said faceplate to trap all light which enters said front major surface and is specularly reflected by said electro-optical display panel and wherein a substantial portion of the substantially randomly directed light provided by said electro-optical display panel escapes through said faceplate.

16. An electro-optical display system comprising:
(a) an electro-optical display panel having a specularly reflecting display surface and means for providing substantially randomly directed light; and
(b) a faceplate having front and back major surfaces, said back major surface being adjacent to said electro-optical display panel, said faceplate including a plurality of optical fibers aligned such that the cylindrical axes of said fibers are parallel to one another and slanted at an acute angle from the perpendicular to said back major surface, said front major surface being angled with respect to said back major surface so that said faceplate is wedged in the direction of the slant of said optical fibers, wherein the slant of said optical fibers is sufficient for said faceplate to trap all light which enters said front major surface and is specularly reflected by said electro-optical display panel, wherein a substantial portion of the substantially randomly directed light provided by said electro-optical display panel escapes through said faceplate, and wherein the wedge angle of said faceplate is sufficient to reduce the amount of said substantially randomly directed light which is totally internally reflected at the front major surface of said faceplate.

17. The system of claim 15 or 16 wherein said electro-optical display panel is a reflective-type liquid crystal display and said means for providing substantially randomly directed light includes a liquid crystal light valve operating in the dynamic scattering mode so that light entering said liquid crystal display through said faceplate is selectively either specularly reflected and trapped within said faceplate or substantially randomly scattered such that a substantial portion escapes through said faceplate.

18. The system of claim 15 or 16 wherein said means for providing substantially randomly directed light includes an array of diffuse light emitting devices, wherein all light which enters the front surface of said faceplate is specularly reflected by said electro-optical display panel and trapped within said faceplate and wherein a substantial portion of the diffuse, randomly directed light emitted by said array escapes through said faceplate.

19. The system of claim 18 wherein said array of light emitting devices is comprised of light emitting diodes.

20. The system of claim 18 wherein said array of light emitting devices is comprised of thin film electroluminescent devices.

21. The system of claim 18 wherein said array of light emitting devices is comprised of gas discharge elements.

* * * * *